Dec. 18, 1923.
C. A. CLEMENT ET AL
1,477,541
MOTION PICTURE MACHINE
Filed Dec. 24, 1921    2 Sheets-Sheet 1
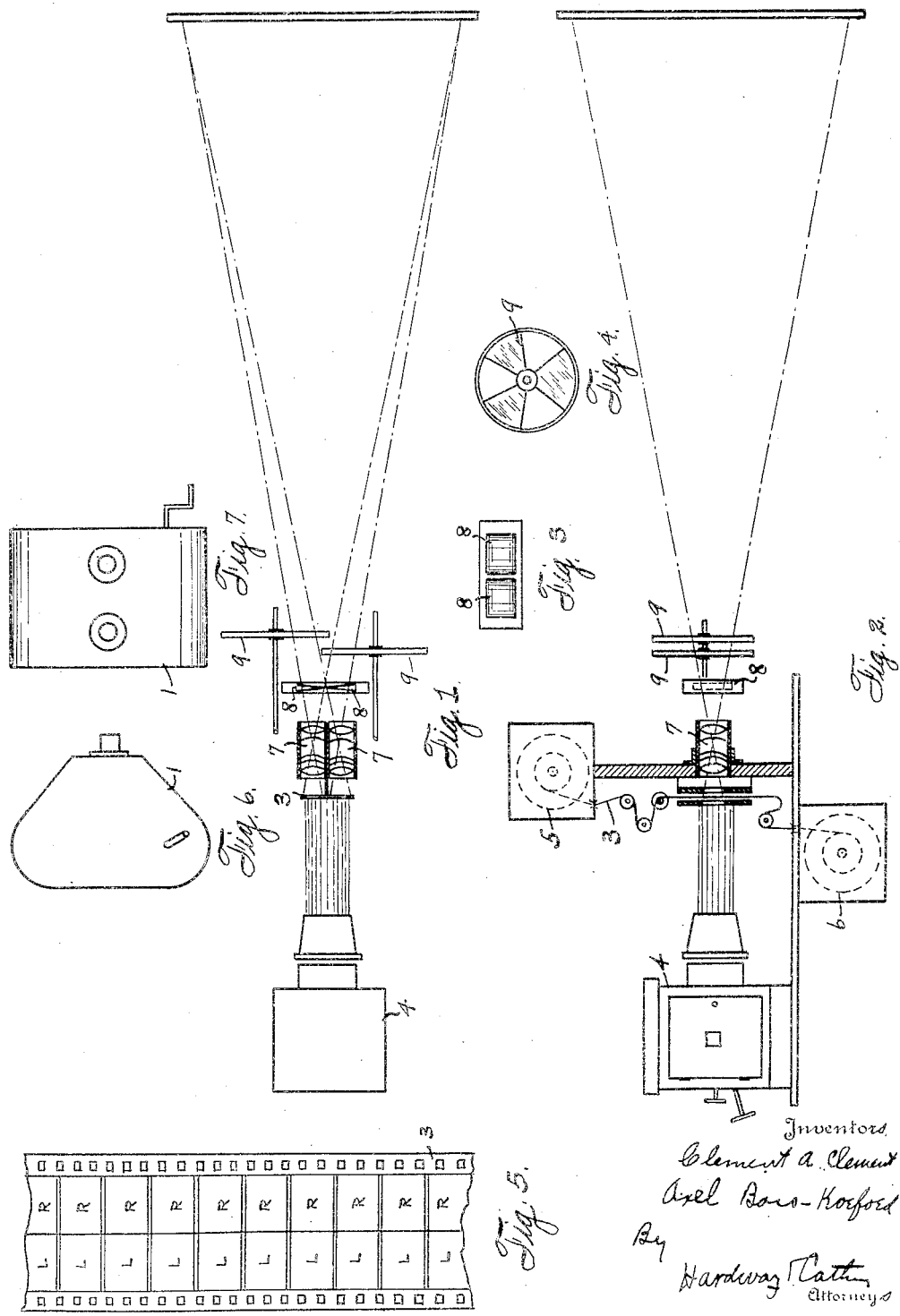

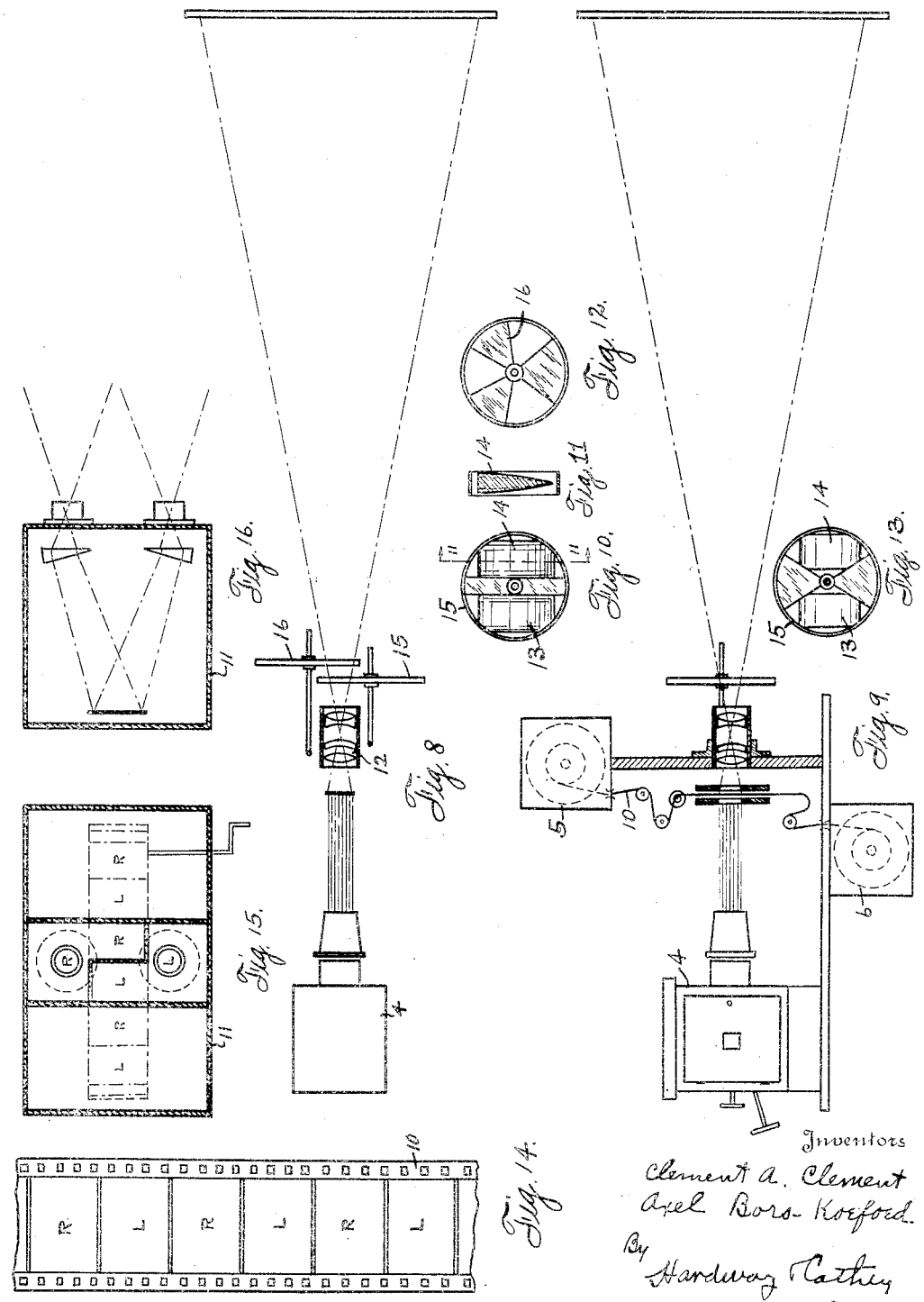

Patented Dec. 18, 1923.

1,477,541

UNITED STATES PATENT OFFICE.

CLEMENT A. CLEMENT AND AXEL BORS-KOEFOED, OF HOUSTON, TEXAS; SAID BORS-KOEFOED ASSIGNOR TO SAID CLEMENT, TRUSTEE.

MOTION-PICTURE MACHINE.

Application filed December 24, 1921. Serial No. 524,668.

*To all whom it may concern:*

Be it known that we, CLEMENT A. CLEMENT and AXEL BORS-KOEFOED, citizens of the United States, residing at Houston, in the county of Harris and State of Texas, have invented certain new and useful Improvements in a Motion-Picture Machine, of which the following is a specification.

This invention relates to new and useful improvements in a motion picture machine.

One object of the invention is to provide a machine of the character described whereby images taken at optic angles may be simultaneously projected on the screen so as to give a relief effect.

Another object of the invention is to provide a moving picture machine so constructed that they will project pictures from films formed with images arranged in pairs, the images of the respective pairs being substantially similar but taken at optic angles to each other with the result that the projected pictures will have the appearance of solidity thus giving a relief effect.

Another object of the invention is to provide a novel type of film with the images thereon arranged in pairs, the images of the respective pairs being similar but taken at optic angles to each other.

A further feature resides in the provision of an improved type of lens employed.

With the above and other objects in view the invention has particular relation to certain novel features of construction, operation and arrangement of parts, an example of which is given in this specification and illustrated in the accompanying drawings, wherein:—

Figure 1 is a plan view of a picture taking machine shown partially in section.

Figure 2 is a side view thereof.

Figure 3 shows an elevation of a lens employed.

Figure 4 illustrates a shutter employed.

Figure 5 illustrates a section of the film.

Figures 6 and 7 show side and front views of a camera employed for taking the pictures in the formation of said film.

Figure 8 shows a plan view of another type of moving picture machine.

Figure 9 shows a side elevation thereof partially in section.

Figure 10 shows a front view of the type of lens employed in this form of machine.

Figure 11 shows a sectional view thereof.

Figure 12 shows a type of shutter employed.

Figure 13 shows side view of the lens and shutter in combination.

Figure 14 shows a section of a type of film employed in this form of machine and, Figures 15 and 16 show vertical and horizontal section views of the picture taking machine employed in the formation of this type of film.

Referring now more particularly to the drawings, wherein like numerals of reference designate similar parts in each of the figures, the numeral 1 designates a motion picture camera provided for the purpose of taking the pictures or images arranged on the film 3 in pairs, as illustrated in Figure 5. The construction of this picture taking machine is well known but it is so constructed that two similar images will be taken simultaneously, but at an optic angle to each other—that is the film will be composed of images arranged in pairs each pair consisting of a right and left image, images of said pairs being taken at an optic angle to each other.

The numeral 4 designates the lamp house of motion picture machine. The film travels, in the usual way, in front of the condenser from one of the film spools 5 to the other spool 6. The corresponding right and left images are simultaneously projected onto the screen through the objective lenses 7 and the stereoscopic lenses 8 and will give a relief or stereoscopic effect on the screen.

Shutters 9 are of conventional form, operation and use.

In the type of machine illustrated in Figures 8 and 9 the right and left images are alternately arranged on the film 10, as illustrated in Figure 14. For the purpose of making these films a motion picture camera 11, as illustrated in Figures 15 and 16, is employed whereby right and left views are taken simultaneously and at an optic angle to each other. The movement of the film 10 is effected in the usual and well known manner to project the images in rapid succession on the screen. The images are projected through the same objective lens 12 in very rapid succession. A rapidly rotating disc 15 is arranged in front of the objective lens 12 and is provided with reversely arranged stereoscopic lenses 13 and 14 and the right and left images are successively projected through these lenses onto the screen thus giving a relief, or stereoscopic effect.

What we claim is:—

1. A motion picture machine including a lamp house, a film arranged to move in front of the lamp house, and provided with pairs of similar images taken at optic angles to each other, an objective lens arranged in front of the film through which the films of the respective pairs are alternately projected, a rotating disc arranged in front of the objective lens and provided with reversely arranged stereoscopic lenses through which the respective images of the pairs are successively projected.

2. In a motion picture machine a rotary member formed with a pair of reversely arranged stereoscopic lenses.

In testimony whereof we have signed our names to this specification in the presence of two subscribing witnesses.

CLEMENT A. CLEMENT.
AXEL BORS-KOEFOED.

Witnesses:
W. H. DUNLAY,
E. V. HARDWAY.